US012630713B2

(12) United States Patent
Shi et al.

(10) Patent No.: US 12,630,713 B2
(45) Date of Patent: May 19, 2026

(54) ANTI-CONDENSATION COMPOSITION, ANTI-CONDENSATION LIQUID COOLING PLATE, PREPARATION METHOD AND APPLICATION THEREOF

(71) Applicant: Jiangsu Changneng Energy-saving New Materials Science & Technology Co., LTD., Jiangsu (CN)

(72) Inventors: Jianfeng Shi, Jiangsu (CN); Li Zhao, Jiangsu (CN); Huijun Yuan, Jiangsu (CN)

(73) Assignee: Jiangsu Changneng Energy-saving New Materials Science & Technology Co., LTD., Jiangsu (CN)

( * ) Notice: Subject to any disclaimer, the term of this patent is extended or adjusted under 35 U.S.C. 154(b) by 0 days.

(21) Appl. No.: 18/818,536

(22) Filed: Aug. 28, 2024

(65) Prior Publication Data

US 2025/0304787 A1  Oct. 2, 2025

(30) Foreign Application Priority Data

Apr. 1, 2024  (CN) .......................... 202410386993.4

(51) Int. Cl.
| | |
|---|---|
| *C08L 75/06* | (2006.01) |
| *C08G 18/38* | (2006.01) |
| *C08G 18/42* | (2006.01) |
| *C08G 18/66* | (2006.01) |
| *C08J 9/14* | (2006.01) |
| *C08K 3/013* | (2018.01) |
| *C08K 3/36* | (2006.01) |
| *C08L 83/04* | (2006.01) |
| *C09D 5/00* | (2006.01) |
| *C09D 5/16* | (2006.01) |
| *C09D 5/18* | (2006.01) |
| *C09D 7/40* | (2018.01) |
| *C09D 7/63* | (2018.01) |
| *C09D 7/65* | (2018.01) |
| *C09D 175/04* | (2006.01) |
| *C09D 175/06* | (2006.01) |
| *C09D 175/12* | (2006.01) |

(52) U.S. Cl.
CPC .......... *C08L 75/06* (2013.01); *C08G 18/4202* (2013.01); *C08J 9/144* (2013.01); *C08K 3/36* (2013.01); *C09D 5/1662* (2013.01); *C09D 175/06* (2013.01); *C08G 18/3851* (2013.01); *C08G 18/4211* (2013.01); *C08G 18/6651* (2013.01); *C08G 2150/60* (2013.01); *C08K 3/013* (2018.01); *C08L 83/04* (2013.01); *C08L 2201/02* (2013.01); *C08L 2203/20* (2013.01); *C09D 5/00* (2013.01); *C09D 5/18* (2013.01); *C09D 7/40* (2018.01); *C09D 7/63* (2018.01); *C09D 7/65* (2018.01); *C09D 175/04* (2013.01); *C09D 175/12* (2013.01)

(58) Field of Classification Search
None
See application file for complete search history.

(56) References Cited

U.S. PATENT DOCUMENTS

| | | | | |
|---|---|---|---|---|
| 4,745,152 | A * | 5/1988 | Fock .................. | B32B 17/1077 524/718 |
| 2004/0171765 | A1* | 9/2004 | Tsuji ..................... | C08G 18/10 525/452 |
| 2006/0182922 | A1* | 8/2006 | Ishida ................ | C08G 18/0828 428/44 |
| 2018/0112027 | A1* | 4/2018 | Patel .................. | C08G 18/3885 |
| 2019/0375676 | A1* | 12/2019 | Liang ..................... | C03C 17/32 |

FOREIGN PATENT DOCUMENTS

| | | | |
|---|---|---|---|
| CN | 209457193 | U * | 10/2019 |
| CN | 114656853 | A * | 6/2022 |
| CN | 115568187 | | 1/2023 |
| CN | 116875161 | A * | 10/2023 |

OTHER PUBLICATIONS

KR 2444382 B1 (Han et al) (published Sep. 19, 2022) (machine translation) (Year: 2022).*

* cited by examiner

*Primary Examiner* — Vivian Chen
(74) *Attorney, Agent, or Firm* — JCIPRNET

(57) ABSTRACT

Disclosed are an anti-condensation composition, an anti-condensation liquid cooling plate, a preparation method and application thereof, the composition includes Component A and Component B, and a mass ratio of Component A to Component B is 100:100-103. Specifically, Component A is composed of the following components in parts by weight: 1-2 parts of melamine polyol, 25-30 parts of polyester polyol, 20-25 parts of fire-retardant polyester polyol; 5-10 parts of polyol used as a crosslinking agent; 15-20 parts of a fire retardant; 3-5 parts of a catalyst; 0.9-1.2 parts of silicone; 0.4-0.6 part of water; 8-12 parts of a foaming agent; 0.5-1 part of an auxiliary agent; 0.5-1 part of color paste; and Component B is isocyanate. The liquid cooling plate includes a liquid cooling plate substrate and anti-condensation material prepared by the anti-condensation composition. The anti-condensation composition can be applied to energy storage devices and new energy vehicles.

7 Claims, No Drawings

ANTI-CONDENSATION COMPOSITION, ANTI-CONDENSATION LIQUID COOLING PLATE, PREPARATION METHOD AND APPLICATION THEREOF

CROSS-REFERENCE TO RELATED APPLICATION

This application claims the priority benefit of China application serial no. 202410386993.4, filed on Apr. 1, 2024. The entirety of the above-mentioned patent application is hereby incorporated by reference herein and made a part of this specification.

TECHNICAL FIELD

The present disclosure relates to a composition, a liquid cooling plate, a preparation method and application, and particularly relates to an anti-condensation composition, an anti-condensation liquid cooling plate, a preparation method and application thereof.

BACKGROUND

With the increasingly rapid development of new energy, demands for battery safety and service life are getting higher and higher. In the field of energy storage, a plurality of battery modules are assembled into a battery pack, and a plurality of battery packs are then placed in a storage compartment through installation. As the battery packs operate continuously, significant amounts of heat are generated, resulting in an increase in a temperature of battery core, and affecting the service life and safety of a battery cell.

At present, heat dissipation methods adopted by energy storage batteries include air cooling and liquid cooling. Specifically, air cooling can lead to uneven temperature distribution, which will affect the service life of the battery, and further, air cooling requires more space for the battery packs, resulting in a great waste of space. Therefore, liquid cooling is the best choice thanks to its better heat dissipation efficiency, lower noise, and greater stability. For the liquid cooling, coolant flows through pipes into cooling plates of each battery pack to take away heat generated by a battery core in the battery pack, thereby achieving cooling.

During the liquid cooling process, a difference between a cooling pipe temperature and an ambient environment, especially in a high-temperature and high-humidity environment, is particularly easy to lead to condensation, posing safety risks and hidden dangers to internal electronic components of the battery, and accordingly affecting the safety and stability of an energy storage system.

In the field of polyurethane field, a test of aging performance after 1000 h at a temperature of 85° C. and 85% RH is an important indicator for assessing the hydrothermal aging of materials. However, performance of the existing ordinary polyurethane materials is significantly degraded in a temperature of 85° C. and 85% RH environment, failing to meet the use requirements.

In the prior art, a method for processing and forming a liquid hydrothermal aging (CN115568187A) is provided, the method further includes a method for setting up a condensation-resistant layer: 1) performing surface polishing to prepare a liquid cooling plate of the anti-condensation plate, which is away from one side of the heat exchange plate, and spraying an epoxy resin layer with a thickness of 0.8-1.2 mm onto the liquid cooling plate of the anti-condensation plate; 2) spraying water on a surface of the epoxy resin layer by using an plasma gun to activate the epoxy resin layer, and arranging an SMC composite material layer on one side of the epoxy resin layer away from the heat exchange plate, so as to obtain a condensation-resistant layer formed by overlapping the epoxy resin layer and the SMC composite material layer; and 3) polishing a surface of a primary finished product of the liquid cooling plate to obtain the liquid cooling plate. However, the method has a complicated preparation process and is unable to be lightweighting.

SUMMARY

Objectives of the present disclosure: a first technical problem to be solved by the present disclosure is to provide an anti-condensation composition that has the properties of heat preservation, anti-condensation, and low thermal conductivity properties while meeting the fire retardant performance and resistance of aging performance after 1000 h at a temperature of 85° C. and 85% RH;

a second technical problem to be solved by the present disclosure is to provide an anti-condensation liquid cooling plate capable of preventing condensation due to large temperature and humidity differences, thereby ensuring the stability and safety of a device;

a third technical problem to be solved by the present disclosure is to provide a preparation method of the anti-condensation liquid cooling plate; and a fourth technical problem to be solved by the present disclosure is to provide application of the anti-condensation composition.

In order to solve the first technical problem, the present disclosure adopts the following technical solution: an anti-condensation composition, including Component A and Component B, and a mass ratio of Component A to Component B is 100:100-103. Specifically, Component A is composed of the following components in parts by weight: 1-2 parts of melamine polyol, 25-30 parts of polyester polyol, 30-35 parts of fire-retardant polyester polyol; 5-10 parts of polyol used as a crosslinking agent; 15-20 parts of a fire retardant; 3-5 parts of a catalyst; 0.9-1.2 parts of silicone; 0.4-0.6 part of water; 8-12 parts of a foaming agent; 0.5-1 part of an auxiliary agent; 0.5-1 part of color paste; and Component B is isocyanate.

The catalyst is more preferably 3.5-5 parts.

In the above technical solution, preferably, the polyol used as a crosslinking agent has a functionality of 4-5, and a hydroxyl value of 650-750 mgKOH/g.

In the above technical solution, preferably, the polyol used as a crosslinking agent is selected from at least one of NJ-403 or NJ-403A; the melamine polyol has a functionality of 2.5-3 and a hydroxyl value of 230-360 mgKOH/g; the polyester polyol has a functionality of 2-3, a hydroxyl value of 250-350 mgKOH/g, and a viscosity of 2000-10000 mPa·s; the fire-retardant polyester polyol has a functionality of 2-3, a hydroxyl value of 200-250 mgKOH/g, and a viscosity of 20000-150000 mPa·s.

In the above technical solution, preferably, the melamine polyol is selected from EDS-5083L and/or CN-3360; the polyester polyol is selected from at least one of PS-3152, PS-3158, or Terol250; the fire-retardant polyester polyol is selected from RB-79 and/or HF-8730.

In the above technical solution, preferably, the fire retardant is selected from at least one of organophosphates or halogenated organophosphates fire retardant; and Component B is selected from at least one of M20S, 44V20L, or PM-200.

In the above technical solution, preferably, the fire retardant is selected from at least one of tris(2-chloropropyl) phosphate, tris(dichloropropyl) phosphate, dimethyl propyl phosphonate, tris(butoxyethyl) phosphate or triethyl phosphate; the catalyst is selected from at least three of PC5, A1, A33, PC41, PC46, or K15; the silicone is selected from at least one of AK8805, L6900, B8545, or DC193; the foaming agent is selected from environmentally friendly foaming agents 245fa and/or LBA; and excess foaming agent will deteriorate physical properties, making the material brittle, while too much water will cause poor thermal conductivity and also make the material brittle.

In the above technical solution, preferably, the auxiliary agent is fumed silica.

In order to solve the second technical problem, the present disclosure adopts the following technical solution: an anti-condensation liquid cooling plate, including a liquid cooling plate substrate and anti-condensation material covering a surface of the liquid cooling plate substrate, where components of the anti-condensation material are the components of the anti-condensation composition.

In order to solve the third technical problem, the present disclosure adopts the following technical solution: a preparation method of the anti-condensation liquid cooling plate, where Component A and Component B of the anti-condensation composition are mixed and atomized, sprayed onto the surface of the liquid cooling plate substrate, the surface of the liquid cooling plate substrate is covered after foaming, and curing is performed to form the anti-condensation liquid cooling plate.

The method further includes the following steps:

(1) preparation of Component A:

weighing the following components in parts by weight: 1-2 parts of melamine polyol; 25-30 parts of the polyester polyol; 30-35 parts of the fire-retardant polyester polyol; 5-10 parts of the polyol used as a cross-linking agent; 15-20 parts of the fire retardant; 3.5-5 parts of the catalyst, 0.9-1.2 parts of the silicone; 0.4-0.6 part of the water; 8-12 parts of the foaming agent; 0.5-1 part of the auxiliary agent; and 0.5-1 part of the color paste; placing the weighted components into a reaction kettle, controlling temperature of the components at 25-40° C., stirring evenly and then dividing and placing into a closed container A;

(2) preparation of Component B: Component B is isocyanate and placed into a closed container B;

(3) a mass ratio of Component A to Component B is set to 100:100-103, specifically, Component A and Component B are atomized by compressed air using high-pressure spray equipment, a mixing and atomization temperature is controlled to be 25-40° C., and sprayed onto the surface of the liquid cooling plate substrate for molding; the surface of the liquid cooling plate substrate is completely covered with foamed material, and the material is cured at room temperature for 20-30 min to obtain the anti-condensation material; and a thickness of the anti-condensation material is 2-31 mm, based on an ambient humidity of ≤85% RH, and a temperature difference between cooling liquid and an environment is ≤20° C., and a thickness of the anti-condensation material is preferably 3-5 mm.

In order to solve the fourth technical problem, the present disclosure adopts the following technical solution: application of the anti-condensation composition in energy storage devices and new energy vehicles.

In the above technical solution, application of the anti-condensation composition in energy storage devices and new energy vehicles is preferred.

Principle of the present disclosure: the present disclosure provides an anti-condensation composition. In order to achieve excellent fire-retardant performance, excessive addition of fire retardants can deteriorate physical properties of the material. Therefore, fire-retardant polyester polyol is added to the composition to meet the UL94V0 fire-retardant requirements. The fire-retardant polyester polyol has a problem of excessive viscosity, therefore, in order to balance the viscosity of the system, fire-retardant performance and resistance of aging performance after 1000 h at a temperature of 85° C. and 85% RH, the present disclosure adjusts ratios of the fire-retardant polyester polyol, polyester polyol, and polyol used as crosslinking agent to balance average functionality and appropriate viscosity of the entire system.

Beneficial effects: compared with the prior art, the present disclosure achieves the following significant advantages: (1) the anti-condensation composition in the present disclosure incorporates low thermal conductivity auxiliary agent and environmentally friendly foaming agent in the formulation, which reduces density and thermal conductivity, significantly improving anti-condensation performance, bonding performance and physical properties of the material. In addition, fumed silica can be used to prevent sedimentation of the color paste. In Component A, the melamine polyol and high-functionality polyol used as a crosslinking agent are added in Component A to increase the strength of the material. Moreover, the crosslinking agent in the present disclosure is not only used as a crosslinking agent but also as a polyether polyol, enhancing strength and preventing that the resistance of aging performance after 1000 h at a temperature of 85° C. and 85% RH from meeting the requirements. (2) By using the crosslinking agent and the interaction between the components to make the anti-condensation material on the anti-condensation liquid cooling plate has low density, low thermal conductivity and excellent bonding performance, and also meets the UL94V0 fire retardant requirements, aging resistance and other excellent properties, achieving good technical effects. (3) The anti-condensation composition in the present disclosure can be applied to the liquid cooling plates of battery packs of energy storage devices and new energy vehicles, which can solve the problem of condensation on the liquid cooling plate due to great temperature and humidity differences, thereby ensuring the stability and safety of power batteries in energy storage devices or new energy vehicles.

DETAILED DESCRIPTIONS OF THE EMBODIMENTS

The present disclosure will be further described in detail below.

TABLE 1

| List of raw materials | | | |
| --- | --- | --- | --- |
| Category of raw material | Name of raw material | Manufacturer | Remark |
| Melamine polyol | CN-3360 | Jiangsu Changneng Energy Saving New Materials Co., Ltd. | Functionality 3, hydroxyl value 360 mgKOH/g |

TABLE 1-continued

List of raw materials

| Category of raw material | Name of raw material | Manufacturer | Remark |
|---|---|---|---|
| | EDS-5083L | Jiangsu Changneng Energy Saving New Material Co., Ltd. | Functionality 2, hydroxyl value 230 mgKOH/g |
| Polyester polyol | PS-3152 | Stepan | Functionality 2.5, hydroxyl value 315 mgKOH/g; viscosity (25° C.) 2000-3000 mPa · s |
| | PS-3158 | Stepan | Functionality 2.5, hydroxyl value 300 mgKOH/g; viscosity (25° C.) 7000-8000 mPa · s |
| | Terol-250 | Shanghai Huntsman Chemicals Co., Ltd. | Functionality 2, hydroxyl value 250 mgKOH/g; viscosity (25° C.) 4000-6000 mPa · s |
| Fire-retardant polyester polyol | RB-79 | Albemarle | Functionality 2.5, hydroxyl value 250 mgKOH/g; viscosity (25° C.) 90000 mPa · s |
| | HF-8730 | Zhejiang Huafon New Materials Co., Ltd. | Functionality 3, hydroxyl value 250 mgKOH/g; viscosity (25° C.) 25000 mPa · s |
| Crosslinking agent | NJ-403 | Jurong Ningwu New Material Co., Ltd. | Functionality 4, hydroxyl value 790 mgKOH/g |
| | NJ-403A | Jurong Ningwu New Material Co., Ltd. | Functionality 4, hydroxyl value 780 mgKOH/g |
| Fire retardant | TEP | Jiangsu Yoke Technology | — |
| | TCPP | Jiangsu Yoke Technology | — |
| Catalyst | PC5 | Evonik Specialty Chemicals (Shanghai) | — |
| | A1 | Momentive Performance Materials | — |
| | A33 | Momentive Performance Materials | — |
| | PC41 | Evonik Specialty Chemicals (Shanghai) | — |
| | K15 | Evonik Specialty Chemicals (Shanghai) | — |
| Foaming agent | 245fa | Honeywell | — |
| | LBA | Honeywell | |
| Auxiliary agent | KS-150 | Anhui Zaisheng New Material | — |
| Color paste | Black | Bomex (Shanghai) | — |
| Silicone | AK-8805 | Jiangsu Maysta Chemical | — |
| | B8545 | Evonik Specialty Chemicals (Shanghai) | — |
| | DC193 | Evonik Specialty Chemicals (Shanghai) | — |
| Isocyanate | M20S | BASF | — |
| | PM-200 | Wanhua Chemical | — |

Example 1

(1) Preparation of Component A:

the following components were weighed in parts by weight, 1 part of the melamine polyol CN-3360; 28 parts of the polyester polyol PS-3158; 30 parts of the fire-retardant polyester polyol HF-8730; 5 parts of the polyol used as a crosslinking agent NJ-403; 18.9 parts of the fire retardant TEP; 2 parts of the catalyst PC5, 1 part of the catalyst PC41, and 0.5 part of the catalyst K15; 0.9 part of the silicone AK-8805; 0.4 part of water; 10.8 parts of the foaming agent 245fa; 0.5 part of the auxiliary agent KS-150; and 1 part of the black color paste; the weighted components were placed into a reaction kettle, a temperature of the materials was controlled at 25° C., stirred evenly and placed into a 250 Kg closed container;

(2) preparation of Component B:

Component B was isocyanate: M20S, which was placed into a 250 Kg closed container;

(3) Component A and Component B were atomized by compressed air using high-pressure spray equipment, and sprayed onto a surface of an liquid cooled module for energy storage of a battery pack for molding; and the surface of the liquid cooled module for energy storage was completely covered with foamed material with a thickness of 3 mm that has been sprayed onto the surface, and the thickness was controlled by automated spraying and then cured at room temperature for 20 min to obtain anti-condensation liquid cooling plate material.

Condensation of the liquid cooling plate covered with the anti-condensation material was tested under different temperature and humidity conditions:

At 25° C., 35° C., 45° C., and 55° C., with each temperature corresponding to environments of RH 55% and 65%, respectively, 18° C. constant temperature water was circulated for 2 h on the liquid cooling plate, and condensation of the liquid cooling plate was observed. Test results showed that no condensation was observed on a surface of the liquid cooling plate under the above test conditions.

Example 2

(1) Preparation of Component A:

the following components were weighed in parts by weight, 1 part of the melamine polyol CN-3360; 28 parts of the polyester polyol PS-3158; 30 parts of the fire-retardant polyester polyol HF-8730; 5 parts of the polyol used as a crosslinking agent NJ-403; 18.9 parts of the fire retardant TEP; 2 parts of the catalyst PC5, 1 part of the catalyst PC41, and 0.5 part of the catalyst K15; 0.9 part of the silicone AK-8805; 0.4 part of water; 10.8 parts of the foaming agent 245fa; 0.5 part of the auxiliary agent KS-150; and 1 part of the black color paste; the weighted components were placed into a reaction kettle, a temperature of the materials was controlled at 40° C., stirred evenly and placed into a 250 Kg closed container;

(2) preparation of Component B:

Component B was isocyanate: M20S, which was placed into a 250 Kg closed container;

(3) Component A and Component B were atomized by compressed air using high-pressure spray equipment, and sprayed onto a surface of an liquid cooled module for energy storage of a battery pack for molding; and the surface of the liquid cooled module for energy storage was completely covered with foamed material with a thickness of 5 mm that has been sprayed onto the surface, and the thickness was controlled by automated spraying and then cured at room temperature for 30 min to obtain anti-condensation liquid cooling plate material.

Examples 3-13 and Comparative Examples 1-2

Examples 3-13 and Comparative Examples 1-2 are different from Example 1 in terms of reaction raw materials and ratios, and specific parameters are shown in Tables 2 and 3.

Test data of physical properties of the anti-condensation liquid cooling plate material obtained in Examples 1, 3-13, and Comparative Examples 1-2 are shown in Tables 4 and 5.

Minimum thicknesses of anti-condensation material layers of the liquid cooling plate under different environmental conditions for Examples 1, 3-13, and Comparative Examples 1-2 are shown in Tables 6 and 7.

TABLE 2

| Raw material of each component for Examples 1, 3-7 and Comparative Examples 1-2 in parts by weight | | | | | | | | |
|---|---|---|---|---|---|---|---|---|
| Raw Materials | Example 1 | Example 3 | Example 4 | Example 5 | Example 6 | Example 7 | Comparative Example 1 | Comparative Example 2 |
| Component A: Melamine polyol: | | | | | | | | |
| CN-3360 | 1 | — | 2 | — | 1 | — | — | — |
| EDS-5083L | — | 2 | — | 1 | — | 1 | 2 | 1 |
| Polyester polyol: | | | | | | | | |
| PS-3158 | 28 | — | — | 25 | 26.5 | — | — | 25 |
| PS-3152 | — | 25 | — | — | — | 29 | 60 | — |
| Terol-250 | — | — | 25 | — | — | — | — | — |
| Fire-retardant polyester polyol: | | | | | | | | |
| HF-8730 | 30 | — | — | 30 | 30 | — | — | 30 |
| RB-79 | — | 35 | 31 | — | — | 30 | — | — |
| Polyol used as a crosslinking agent: | | | | | | | | |
| NJ-403 | 5 | — | — | 9.6 | — | 10 | — | 9.6 |
| NJ-403A | — | 5 | 7 | — | 8 | — | 5 | — |
| Fire retardant: | | | | | | | | |
| TEP | 18.9 | 15.2 | — | — | 18.1 | — | 15.2 | — |
| TCPP | — | — | 15.7 | 19.1 | — | 15 | — | 19.1 |
| Catalyst: | | | | | | | | |
| PC5 | 2 | — | 2 | — | — | 1 | 1 | — |
| A1 | — | 2 | 1 | 2 | 1 | 1 | 2 | 2 |
| A33 | — | 1 | 0.5 | 1 | 1 | 0.5 | 1 | 1 |
| PC41 | 1 | — | 1 | 0.5 | 1 | 1 | — | 0.5 |
| K15 | 0.5 | 2 | — | 0.5 | 0.5 | — | 2 | 0.5 |
| Foaming agent: | | | | | | | | |
| 245fa | 10.8 | — | 11.7 | — | 10 | — | — | — |
| LBA | — | 9.8 | — | 8.1 | — | 8.5 | 9.8 | 8.7 |
| Auxiliary agent: KS-150 | 0.5 | 1 | 0.5 | 1 | 0.5 | 1 | 1 | — |
| Color paste: Black | 1 | 0.5 | 1 | 0.6 | 0.8 | 0.5 | 0.5 | 0.6 |
| Water | 0.4 | 0.5 | 0.4 | 0.6 | 0.5 | 0.6 | 0.5 | — |
| Silicone: | | | | | | | | |
| AK-8805 | 0.9 | — | — | 1.0 | — | — | — | 2.0 |
| B8545 | — | 1.0 | — | — | — | — | 1.0 | — |
| DC193 | — | — | 1.2 | — | 1.1 | 0.9 | — | — |
| Component B: Isocyanate: | | | | | | | | |
| M20S | 100 | — | 103 | — | 103 | — | — | — |
| PM-200 | — | 103 | — | 100 | — | 103 | 103 | 100 |

TABLE 3

| Raw Materials | Example 8 | Example 9 | Example 10 | Example 11 | Example 12 | Example 13 |
|---|---|---|---|---|---|---|
| Component A: Melamine polyol: | | | | | | |
| CN3360 | 1 | 1 | 1 | | | 1 |
| EDS5083L | | | | 1 | 1 | 1 |
| Polyester polyol: | | | | | | |
| PS3158 | 27 | | | 27 | | |
| PS3152 | | 28 | 27 | | 29 | |
| Terol250 | | | | | | 29 |
| Fire-retardant polyester polyol: | | | | | | |
| HF8730 | 15 | 19.5 | 24.5 | 17 | 9 | 18 |
| RB79 | 19.5 | 13 | 9 | 16 | 25 | 14 |
| Polyol used as a crosslinking agent: | | | | | | |
| NJ403 | 5 | | | 6 | | 5 |
| NJ403A | | 5 | 5 | | 6.5 | |
| Fire retardant: | | | | | | |
| TEP | 17.5 | | | | 15 | |
| TCPP | | 16.5 | 16.5 | 18 | | 18.5 |
| Catalyst: | | | | | | |
| PC5 | | 1 | | | | |
| A1 | 1 | 1 | 1 | 1.5 | 1.5 | 1.5 |
| A33 | 0.5 | 1 | 1 | 1 | 1 | |
| PC41 | 0.5 | 0.5 | 2 | | 0.5 | 1 |
| K15 | 1 | | 0.5 | 1 | | 0.5 |
| Foaming agent: | | | | | | |
| 245fa | 9.5 | | 9 | | | 7.9 |
| LBA | | 10.5 | | 9.1 | 8.5 | |
| Auxiliary agent: KS150 | 0.5 | 1 | 1 | 0.5 | 1 | 0.5 |
| Color paste: Black | 0.5 | 0.5 | 0.5 | 0.5 | 0.5 | 0.5 |
| Water | 0.5 | 0.4 | 0.5 | 0.5 | 0.5 | 0.6 |
| Silicone: | | | | | | |
| AK8805 | | | 1 | | 1 | |
| B8545 | | 1.1 | | 0.9 | | |
| DC193 | 1 | | | | | 1 |
| Component B: Isocyanate: | | | | | | |
| M20S | 100 | | 103 | | 103 | |
| PM200 | | 103 | | 100 | | 103 |

TABLE 4

Test data of physical properties of anti-condensation material for liquid
cooling plate obtained in Examples 1, 3-7, and Comparative Examples 1-2

| Property index | Example 1 | Example 3 | Example 4 | Example 5 | Example 6 | Example 7 | Comparative Example 1 | Comparative Example 2 |
|---|---|---|---|---|---|---|---|---|
| Density: g/cm³ | 61 | 62 | 61 | 60 | 62 | 61 | 62 | 120 |
| Thermal conductivity: W/(m · k@25° C.) | 0.022153 | 0.022358 | 0.022116 | 0.022525 | 0.022124 | 0.022653 | 0.023653 | 0.024679 |
| Hardness | 77 | 78 | 77 | 76 | 79 | 77 | 75 | 77 |
| Tensile strength, Mpa | 0.52 | 0.54 | 0.52 | 0.50 | 0.53 | 0.53 | 0.50 | 0.52 |
| Compressive strength, Mpa | 0.61 | 0.63 | 0.62 | 0.61 | 0.62 | 0.61 | 0.59 | 1.61 |
| Bonding strength, Mpa | 0.49 | 0.52 | 0.51 | 0.51 | 0.52 | 0.51 | 0.45 | 0.50 |
| Close cell content, % | 97 | 96 | 96 | 97 | 96 | 97 | 95 | 96 |
| Water absorption, % | 1.2 | 1.1 | 1.0 | 1.1 | 1.0 | 1.1 | 1.1 | 1.2 |
| Combustion characteristics, % | UL94-V0 | UL94-V0 | UL94-V0 | UL94-V0 | UL94-V0 | UL94-V0 | UL94-V1 | UL94-V0 |
| High temperature resistance, 120° C., 96 h | No cracking, no peeling | No cracking, no peeling | No cracking, no peeling | No cracking, no peeling | No cracking, no peeling | No cracking, no peeling | Cracking and slight peeling | No cracking, no peeling |
| Low temperature resistance, −40° C., 96 h | No cracking, no peeling | No cracking, no peeling | No cracking, no peeling | No cracking, no peeling | No cracking, no peeling | No cracking, no peeling | Cracking and slight peeling | No cracking, no peeling |
| Hydrothermal aging cycling, 85° C., 85%, 1000 h | No deformation and dents, no bubbles, no cracking, and no peeling | No deformation and dents, no bubbles, no cracking, and no peeling | No deformation and dents, no bubbles, no cracking, and no peeling | No deformation and dents, no bubbles, no cracking, and no peeling | No deformation and dents, no bubbles, no cracking, and no peeling | No deformation and dents, no bubbles, no cracking, and no peeling | Having deformation, dents, bubbles, cracking and peeling | No deformation and dents, no bubbles, no cracking, and no peeling |
| Hydrothermal aging cycling, 85° C., 85%, 1000 h, and whether adhesion meets 5A or not | Yes | Yes | Yes | Yes | Yes | Yes | No | No |
| Acid/alkali/salt mist resistance | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering |
| Volume resistivity (10¹¹Ω · m) | 47 | 47 | 45 | 48 | 46 | 47 | 45 | 48 |
| Breakdown voltage (10 KV) | 32 | 30 | 30 | 32 | 31 | 31 | 28 | 28 |
| Aging resistance | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | Having obvious color change; having cracking, peeling, deformation or powdering | No obvious color change; no cracking, peeling, deformation or powdering |
| Environmental protection requirements | Meet ROHS | Meet ROHS | Meet ROHS | Meet ROHS | Meet ROHS | Meet ROHS | Meet ROHS | Meet ROHS |

TABLE 5

| Performance Index | Test data of physical properties of anti-condensation material for liquid cooling plate obtained in Examples 8-13 | | | | | |
|---|---|---|---|---|---|---|
| | Example 8 | Example 9 | Example 10 | Example 11 | Example 12 | Example 13 |
| Density, g/cm$^3$ | 61 | 62 | 61 | 62 | 60 | 62 |
| Thermal conductivity: W/(m · k@25° C.) | 0.022117 | 0.022225 | 0.022118 | 0.022532 | 0.022108 | 0.022546 |
| Hardness | 75 | 77 | 77 | 76 | 78 | 76 |
| Tensile strength, Mpa | 0.58 | 0.54 | 0.53 | 0.52 | 0.54 | 0.56 |
| Compressive strength, Mpa | 0.66 | 0.64 | 0.65 | 0.67 | 0.62 | 0.69 |
| Bonding strength, Mpa | 0.51 | 0.52 | 0.5 | 0.5 | 0.51 | 0.53 |
| Close cell content, % | 98 | 97 | 95 | 96 | 97 | 96 |
| Water absorption, % | 1.3 | 1.1 | 1.2 | 1.1 | 1 | 1.1 |
| Combustion characteristics, % | UL94-V0 | UL94-V0 | UL94-V0 | UL94-V0 | UL94-V0 | UL94-V0 |
| High temperature resistance, 120° C., 96 h | No cracking, no peeling | No cracking, no peeling | No cracking, no peeling | No cracking, no peeling | No cracking, no peeling | No cracking, no peeling |
| Low temperature resistance, −40° C., 96 h | No cracking, no peeling | No cracking, no peeling | No cracking, no peeling | No cracking, no peeling | No cracking, no peeling | No cracking, no peeling |
| Hydrothermal aging cycling, 85° C., 85%, 1000 h | No deformation and dents, no bubbles, no cracking, and no peeling | No deformation and dents, no bubbles, no cracking, and no peeling | No deformation and dents, no bubbles, no cracking, and no peeling | No deformation and dents, no bubbles, no cracking, and no peeling | No deformation and dents, no bubbles, no cracking, and no peeling | No deformation and dents, no bubbles, no cracking, and no peeling |
| Hydrothermal aging cycling, 85° C., 85%, 1000 h, and whether adhesion meets 5A or not | Yes | Yes | Yes | Yes | Yes | Yes |
| Acid/alkali/salt mist resistance | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering |
| Volume resistivity (10$^{11}$Ω · m) | 47 | 45 | 47 | 50 | 48 | 47 |
| Breakdown voltage (10 KV) | 30 | 32 | 28 | 28 | 31 | 32 |
| Aging resistance | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering | No obvious color change; no cracking, peeling, deformation or powdering |
| Requirements for Environmental Protection | Meet ROHS | Meet ROHS | Meet ROHS | Meet ROHS | Meet ROHS | Meet ROHS |

TABLE 6

Minimum thickness of the anti-condensation liquid cooling plate material layer obtained in Examples
1-7 covered on the surface of the liquid cooling plate under different environmental conditions

| Medium temperature (° C.) | Ambient temperature (° C.) | Ambient humidity (% RH) | Example 1 | Example 3 | Example 4 | Example 5 | Example 6 | Example 7 |
|---|---|---|---|---|---|---|---|---|
| | | | Minimum thickness required for anti-condensation material layer (mm) | | | | | |
| 18 | 35 | 55 | 2.51 | 2.53 | 2.51 | 2.55 | 2.51 | 2.57 |
| 18 | 35 | 65 | 4.46 | 4.50 | 4.45 | 4.54 | 4.46 | 4.56 |
| 18 | 35 | 75 | 7.94 | 8.01 | 7.92 | 8.07 | 7.92 | 8.11 |
| 18 | 35 | 85 | 15.99 | 16.14 | 15.96 | 16.26 | 15.97 | 16.35 |
| 18 | 45 | 55 | 4.59 | 4.63 | 4.58 | 4.67 | 4.58 | 4.69 |
| 18 | 45 | 65 | 7.31 | 7.38 | 7.30 | 7.44 | 7.30 | 7.48 |
| 18 | 45 | 75 | 12.16 | 12.27 | 12.14 | 12.37 | 12.15 | 12.44 |
| 18 | 45 | 85 | 23.40 | 23.62 | 23.36 | 23.79 | 23.37 | 23.93 |
| 18 | 55 | 55 | 6.38 | 6.44 | 6.37 | 6.49 | 6.38 | 6.53 |
| 18 | 55 | 65 | 9.77 | 9.86 | 9.76 | 9.94 | 9.76 | 9.99 |
| 18 | 55 | 75 | 15.80 | 15.95 | 15.77 | 16.07 | 15.78 | 16.16 |
| 18 | 55 | 85 | 29.78 | 30.05 | 29.73 | 30.28 | 29.74 | 30.45 |

What is claimed is:

TABLE 7

Minimum thickness of the anti-condensation liquid cooling plate material layer obtained in Examples 8-13 and Comparative
Examples 1-2 covered on the surface of the liquid cooling plate under different environmental conditions

| Medium temperature (° C.) | Ambient temperature (° C.) | Ambient humidity (% RH) | Example 8 | Example 9 | Example 10 | Example 11 | Example 12 | Example 13 | Comparative Example 1 | Comparative Example 2 |
|---|---|---|---|---|---|---|---|---|---|---|
| | | | Minimum thickness required for anti-condensation material layer (mm) | | | | | | | |
| 18 | 35 | 55 | 2.51 | 2.52 | 2.51 | 2.55 | 2.51 | 2.55 | 2.79 | 4.04 |
| 18 | 35 | 65 | 4.45 | 4.48 | 4.45 | 4.54 | 4.45 | 4.54 | 4.97 | 7.19 |
| 18 | 35 | 75 | 7.92 | 7.96 | 7.92 | 8.07 | 7.92 | 8.08 | 8.83 | 12.78 |
| 18 | 35 | 85 | 15.96 | 16.04 | 15.96 | 16.26 | 15.96 | 16.27 | 17.79 | 25.75 |
| 18 | 45 | 55 | 4.58 | 4.61 | 4.58 | 4.67 | 4.58 | 4.67 | 5.11 | 7.39 |
| 18 | 45 | 65 | 7.30 | 7.34 | 7.30 | 7.44 | 7.30 | 7.44 | 8.14 | 11.78 |
| 18 | 45 | 75 | 12.14 | 12.20 | 12.14 | 12.37 | 12.14 | 12.38 | 13.53 | 19.59 |
| 18 | 45 | 85 | 23.36 | 23.48 | 23.36 | 23.80 | 23.35 | 23.82 | 26.04 | 37.69 |
| 18 | 55 | 55 | 6.37 | 6.41 | 6.37 | 6.49 | 6.37 | 6.50 | 7.11 | 10.28 |
| 18 | 55 | 65 | 9.76 | 9.80 | 9.76 | 9.94 | 9.75 | 9.94 | 10.87 | 15.74 |
| 18 | 55 | 75 | 15.78 | 15.85 | 15.78 | 16.07 | 15.77 | 16.08 | 17.58 | 25.45 |
| 18 | 55 | 85 | 29.73 | 29.88 | 29.73 | 30.29 | 29.72 | 30.31 | 33.14 | 47.96 |

The testing standards are as follows:
Density: GB/T 6343-2009
Thermal Conductivity: GB/T10294-2008
Hardness: GB/T 2411-2008
Tensile strength: GB/T 9641-1988
Compressive strength: GB/T 8813-2008
Bonding strength: GB/T 7124-2008
Close cell content: GB/T10799-2008
Water absorption: GB/T 8810-2005
Fire retardant: GB/T 2408-2021
High-temperature resistance, 120° C., 96 h: GB/T 2423.2-2008Ab
Low-temperature resistance, −40° C., 96 h: GB/T 2423.2-2008Bb
Hydrothermal aging cycling, 85° C., 85%, 1000 h: GB/T 2423.34-2012
Aging resistance: GB/T 16422.2-2022

As shown in Table 3, the present disclosure employs the synergistic effects of fire retardant, fire-retardant polyester polyol and polyester polyol, melamine polyol, polyol used as a crosslinking agent, and the like, such that the prepared anti-condensation material exhibits excellent physical properties at a density of 60 kg/m³. In addition, the fire retardant performance reaches UL94V0, and the material successfully passes the resistance test of aging performance after 1000 h at a temperature of 85° C. and 85% RH, achieving good technical effects.

What is claimed is:

1. An anti-condensation composition, comprising Component A and Component B, wherein a mass ratio of Component A to Component B is 100:100-103, specifically, Component A is composed of the following components in parts by weight: 1-2 parts of melamine polyol, 25-30 parts of polyester polyol, 30-35 parts of fire-retardant polyester polyol; 5-10 parts of polyol used as a crosslinking agent; 15-20 parts of a fire retardant; 3-5 parts of a catalyst; 0.9-1.2 parts of silicone; 0.4-0.6 part of water; 8-12 parts of a foaming agent; 0.5-1 part of an auxiliary agent; 0.5-1 part of color paste; and Component B is isocyanate.

2. The anti-condensation composition according to claim 1, wherein the polyol used as a crosslinking agent has a functionality of 4-5 and a hydroxyl value of 650-750 mgKOH/g; the melamine polyol has a functionality of 2.5-3 and a hydroxyl value of 230-360 mgKOH/g; the polyester polyol has a functionality of 2-3, a hydroxyl value of 250-350 mgKOH/g, and a viscosity of 2000-10000 mPa·s; and the fire-retardant polyester polyol has a functionality of 2-3, a hydroxyl value of 200-250 mgKOH/g, and a viscosity of 20000-150000 mPa·s.

3. The anti-condensation composition according to claim 1, wherein the fire retardant is selected from at least one of tris (2-chloropropyl) phosphate, tris (dichloropropyl) phosphate, dimethyl propyl phosphonate, tris(butoxyethyl) phosphate or triethyl phosphate; and the auxiliary agent is fumed silica.

4. An anti-condensation liquid cooling plate, comprising a liquid cooling plate substrate and anti-condensation material covering a surface of the liquid cooling plate substrate, wherein components of the anti-condensation material are the components of the anti-condensation composition according to claim 1.

5. The anti-condensation liquid cooling plate according to claim 4, wherein a thickness of the anti-condensation material is 2-31 mm, based on an ambient humidity of ≤85% RH, and a temperature difference between cooling liquid and an environment is ≤20° C.

6. A preparation method of the anti-condensation liquid cooling plate according to claim 4, wherein Component A and Component B of the anti-condensation composition are mixed and atomized, sprayed onto the surface of the liquid cooling plate substrate, the surface of the liquid cooling plate substrate is covered after foaming, and curing is performed to form the anti-condensation liquid cooling plate.

7. The preparation method of the anti-condensation liquid cooling plate according to claim 6, wherein a mixing and atomization temperature is controlled to be 25-40° C., and curing lasts for 20-30 min at room temperature.

* * * * *